(12) United States Patent
Koker et al.

(10) Patent No.: US 10,817,433 B2
(45) Date of Patent: Oct. 27, 2020

(54) PAGE TABLES FOR GRANULAR ALLOCATION OF MEMORY PAGES

(71) Applicant: Intel Corporation, Santa Clara, CA (US)

(72) Inventors: Altug Koker, El Dorado Hills, CA (US); Ankur Shah, Folsom, CA (US); Murali Ramadoss, Folsom, CA (US); Niranjan Cooray, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/457,019

(22) Filed: Jun. 28, 2019

(65) Prior Publication Data

US 2019/0324919 A1    Oct. 24, 2019

(51) Int. Cl.
*G06F 12/1009* (2016.01)
*G06F 12/1027* (2016.01)

(52) U.S. Cl.
CPC ...... *G06F 12/1009* (2013.01); *G06F 12/1027* (2013.01)

(58) Field of Classification Search
CPC .......................... G06F 12/1009; G06F 12/1027
USPC ....................................................... 711/206
See application file for complete search history.

(56) References Cited

U.S. PATENT DOCUMENTS

| 8,032,897 | B2 * | 10/2011 | Serebrin | G06F 12/0292 710/260 |
| 8,271,700 | B1 * | 9/2012 | Annem | G06F 13/28 710/22 |
| 9,058,287 | B2 | 6/2015 | Jacobs et al. | |
| 2006/0149919 | A1 * | 7/2006 | Arizpe | G06F 12/1009 711/206 |
| 2016/0378683 | A1 | 12/2016 | Seiler | |
| 2018/0293183 | A1 | 10/2018 | Cooray et al. | |

FOREIGN PATENT DOCUMENTS

WO    2018/053829 A1    3/2018

OTHER PUBLICATIONS

Intel® 64 and IA-32 Architectures Software Developer's Manual, Section 3, Chapter 4, Combined vols. Table of contents at pp. 2701-2751, and chapter 4, pp. 2805-2852, May, 2019.

* cited by examiner

*Primary Examiner* — Jae U Yu
(74) *Attorney, Agent, or Firm* — Fletcher Yoder, P.C.

(57) ABSTRACT

Systems and methods related to memory paging and memory translation are disclosed. The systems may allow allocation of memory pages with increased diversity in the memory page sizes using page tables dimensioned in a manner that optimizes memory usage by the data structures of the page system.

20 Claims, 7 Drawing Sheets

PAGE TABLES FOR GRANULAR ALLOCATION OF MEMORY PAGES

BACKGROUND

This disclosure relates to memory page systems and, more specifically, to page table systems that manage memory pages with improved page size granularity.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Many digital computing systems may use memory (e.g., memory devices, memory circuitry) to facilitate data processing operations. The memory may store instructions and/or data that can be used during the operation of the computing systems. As such, increases in the memory access speed may lead to significant improvements in the performance of the digital computing systems.

Memory may be accessed by one or more processes running in the computing system. In order to provide memory resources to the processes, certain computing systems may employ virtualized memory to organize the available memory. Virtual memory systems may divide the available memory in blocks or pages that may be assigned to a process. The process may access memory in the memory page using a virtual address, which may be translated to a corresponding physical address by the virtual memory system. The virtual address translation process may employ page tables, data structures that stores mappings between the virtual addresses and the physical addresses. In order to facilitate operations with the memory pages, the memory, pages may have defined dimensions. The defined dimensions may have limited granularity in some situations, reducing the efficiency of memory allocation.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
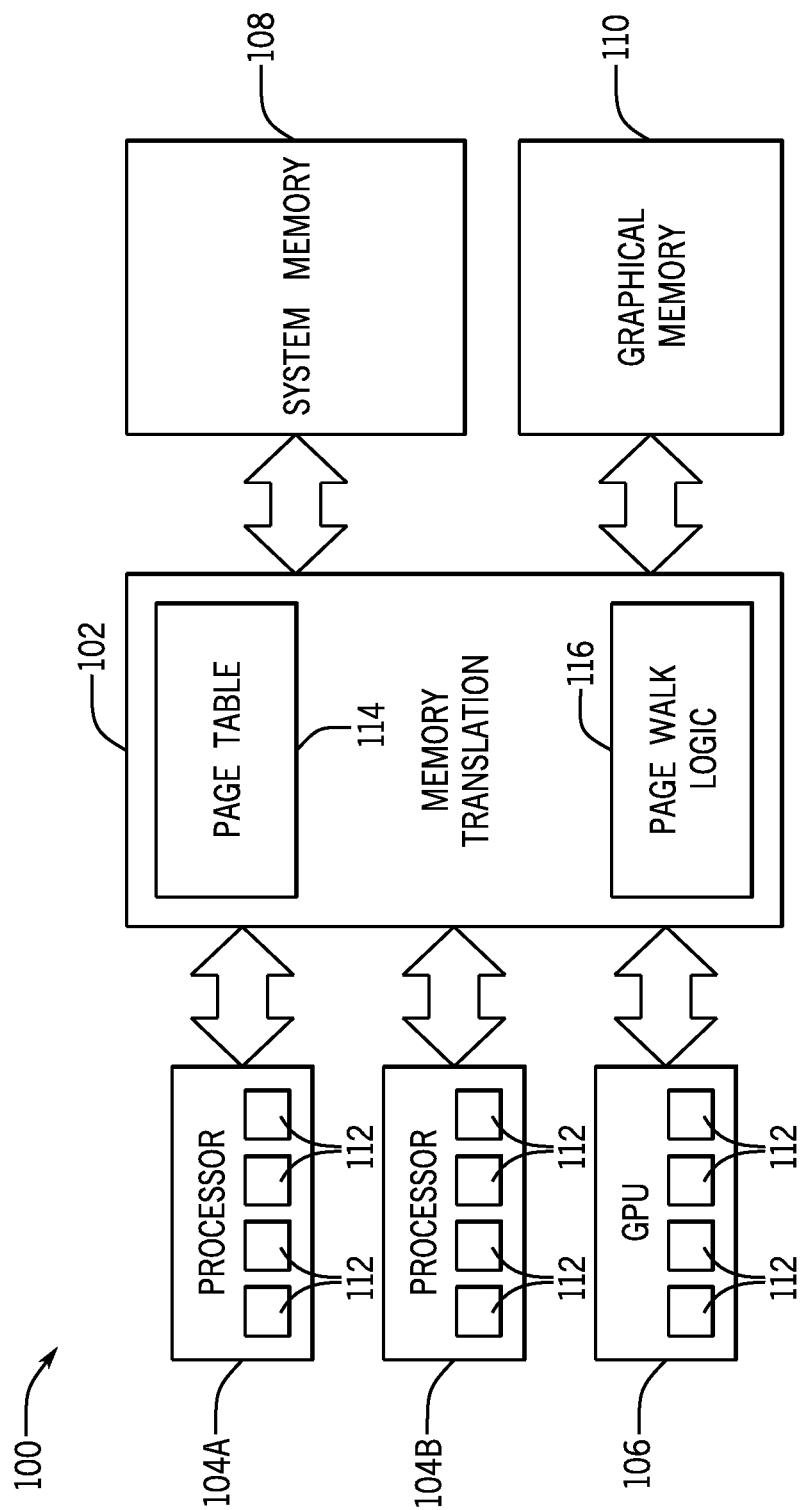
FIG. 1 is a block diagram of an electrical device with processing circuitry that may employ the optimized page tables described herein, in accordance with an embodiment of the disclosure.

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

Paging is a strategy for management of memory in which the available memory (e.g., virtual memory, random access memory (RAM), storage memory) may be organized in contiguous blocks of data or pages. The pages may be allocated to processes running in the computing system by a memory manager. A memory manager that implements a paging system or a virtual memory system, may associate each allocated page with a virtual address, used by a process that uses memory in that page. The memory manager may provide access to the process by converting the virtual address to the physical address. For example, a virtual address may have virtual address portion and a physical address offset. The virtual address portion to a base address of the memory page, and determine the physical address by combining the base address with the physical address offset.

In some embodiments, the available sizes for the memory pages may be limited. As a result, a process that may require an amount of memory between the available memory sizes may receive excessive memory resources. For example, if a paging system allow page sizes with either 4 KB or 2 MB, a process that requires 50 KB may receive an allocation of 2 MB. As such, efficient use of the memory resources may be facilitated by the granularity in the size of the pages, to prevent excessive allocation of memory to the processes.

The virtual memory system may employ page tables to store an association between physical location of the memory and the virtual address. As such, when the virtual memory system receives a request for data in the memory using the virtual address, the virtual memory system may employ the page tables to identify the physical location. Conversion of virtual addresses in page systems may employ a page walk method, which employs the page tables. The page walk method may be an iterative process in which different portions of the virtual address are evaluated in different iterations. In each page walk iteration, a page table entry is selected by a combination of a page table address and an offset based on the virtual address. As a result, the page walk method may be regarded as an iterative method that retrieves a sequence of page tables based on the virtual address. The page table entry may point to a page or to a page table. If the page table entry points to page, the page walk process ends. If the page walk method points to a page table, a new iteration begins, using the target page table's address. The number of iterations performed may be associated with the available page sizes.

For example, a virtual memory system with 48-bit addresses, 4 KB page tables, and 4 levels, may, naturally, support pages with sizes 4 KB (page retrieved with 4-level page walk), 2 MB (page retrieved with 3-level page walk), and 1 GB (page retrieved with 2-level page walk). In many applications, selection between 4 KB pages and 2 MB pages may be limiting and support for intermediate page sizes may be provided by aggregation of multiple pages. As an example, 64 KB pages may be supported by allocating 16 consecutive 4 KB pages, which may be retrieved in a 4-level page walk. In a computing system that presents frequent allocation of 64 KB pages, such as in certain graphical applications, the frequent allocation of consecutive pages may be non-optimal.

Embodiments described herein are related to memory management systems and methods that may use variable page table structures and suitable page table entries that improve granularity in the size of memory pages. Specifically, page tables of at least one page walk level (page tables associated with an iteration of the page walk process) may have different sizes and the page table entries may include data indicating the size of the memory page. Moreover, as detailed below, the size of a page table may be dimensioned based on the size of a memory page associated with the page table. The embodiments may, thus, present a reduced utilization of memory by the page tables. In some embodiments, the retrieval of reduced page tables may be accompanied by prefetching of adjacent page tables, reducing the frequency of page retrieval events. While the specific descriptions related herein focus on with particular page sizes, page table sizes, and addressing schemes, embodiments that employ other in page sizes, page table sizes, and addressing schemes are also subject of this disclosure.

With the foregoing in mind, FIG. 1 illustrates a data processing system 100 that may benefit from the improved page table data structures described herein. The system 100 may have a memory translation system 102. The memory translation system 102 may be coupled to one or more central processing units (CPUs) or processors 104A, 104B to co-processors 106 (e.g., graphics processing units (GPUs), mathematical processors, programmable logic implementing data processing). The memory translation system 102 may manage memory in memory devices, such as system memory 108 (e.g., random access memory device, hard disk devices, solid-state memory devices, etc.), graphical memory 110, or other types of memory. In general, the memory translation circuitry that implements the memory translation system 102 may be in the same die of a processor, may be in a separate die in the same package of the processor (e.g., system-on-chip), or may be in a different package.

Processors 104A, 104B, and co-processor 106 may have one or more processes 112. The memory translation system 102 may allocate one or more pages to the processes 112, and the pages may be used to store instruction data (e.g., instruction stack) and/or data structures used by the respective process 112. To use the allocated memory, processes 112 may request data using a virtual address, and the memory translation system 102 may identify a corresponding physical address. To that end, the memory translation system 102 may include locally stored page tables 114 and a page walk logic 116, which may be implemented as instructions running on a processor and/or as hardware circuitry, that may convert the virtual address to a physical address. In some embodiments, a portion of the page tables 114 may be stored in the system memory 108, and may be retrieved during operation.

Figure 2:
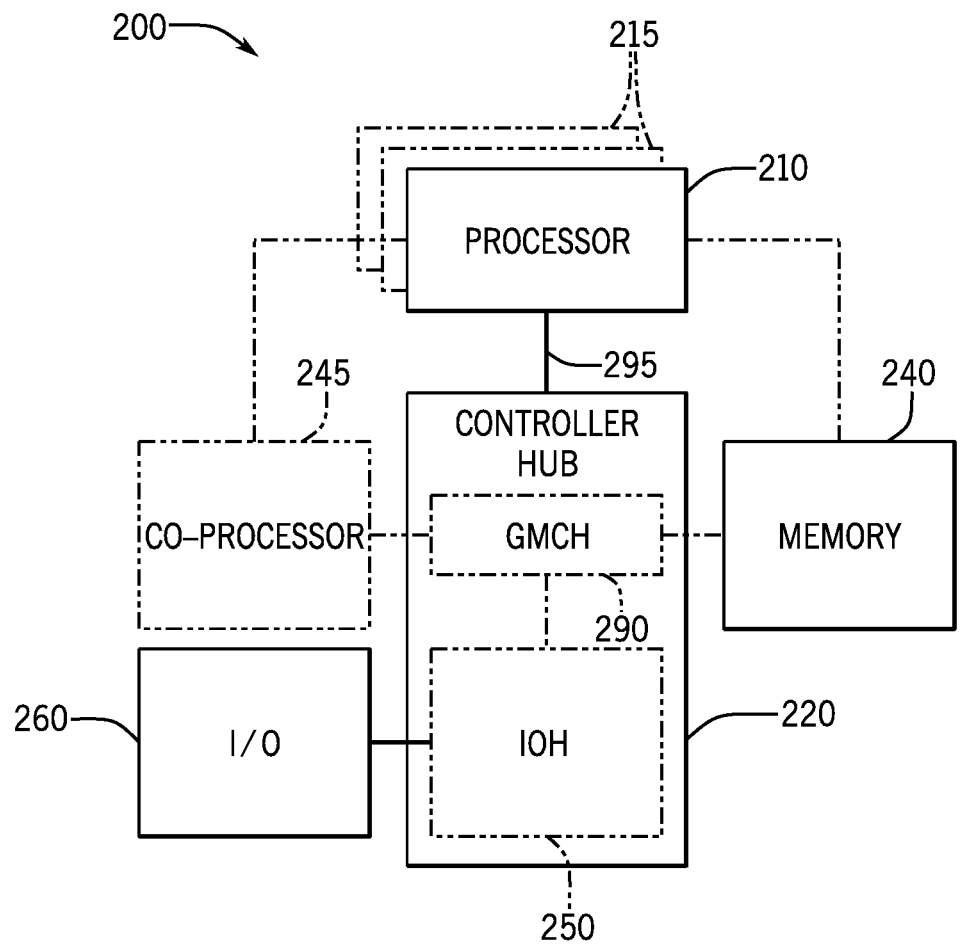
FIG. 2 is a block diagram of a computer system that may employ the optimized page tables described herein, in accordance with one embodiment of the disclosure.
Figure 3:
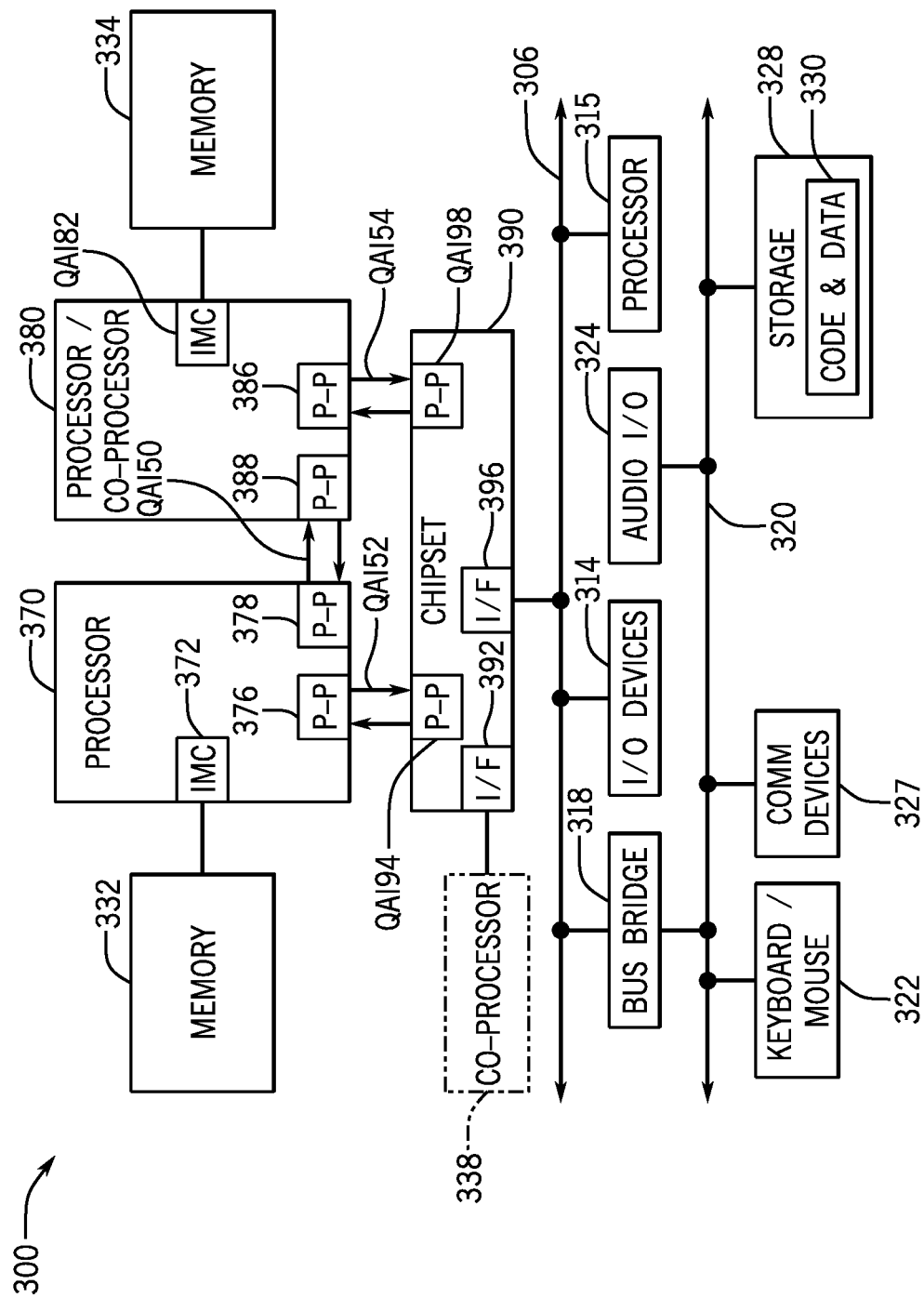
FIG. 3 is a block diagram of a specific example of the computer system of FIG. 2, in accordance with an embodiment of the disclosure.
Figure 4:
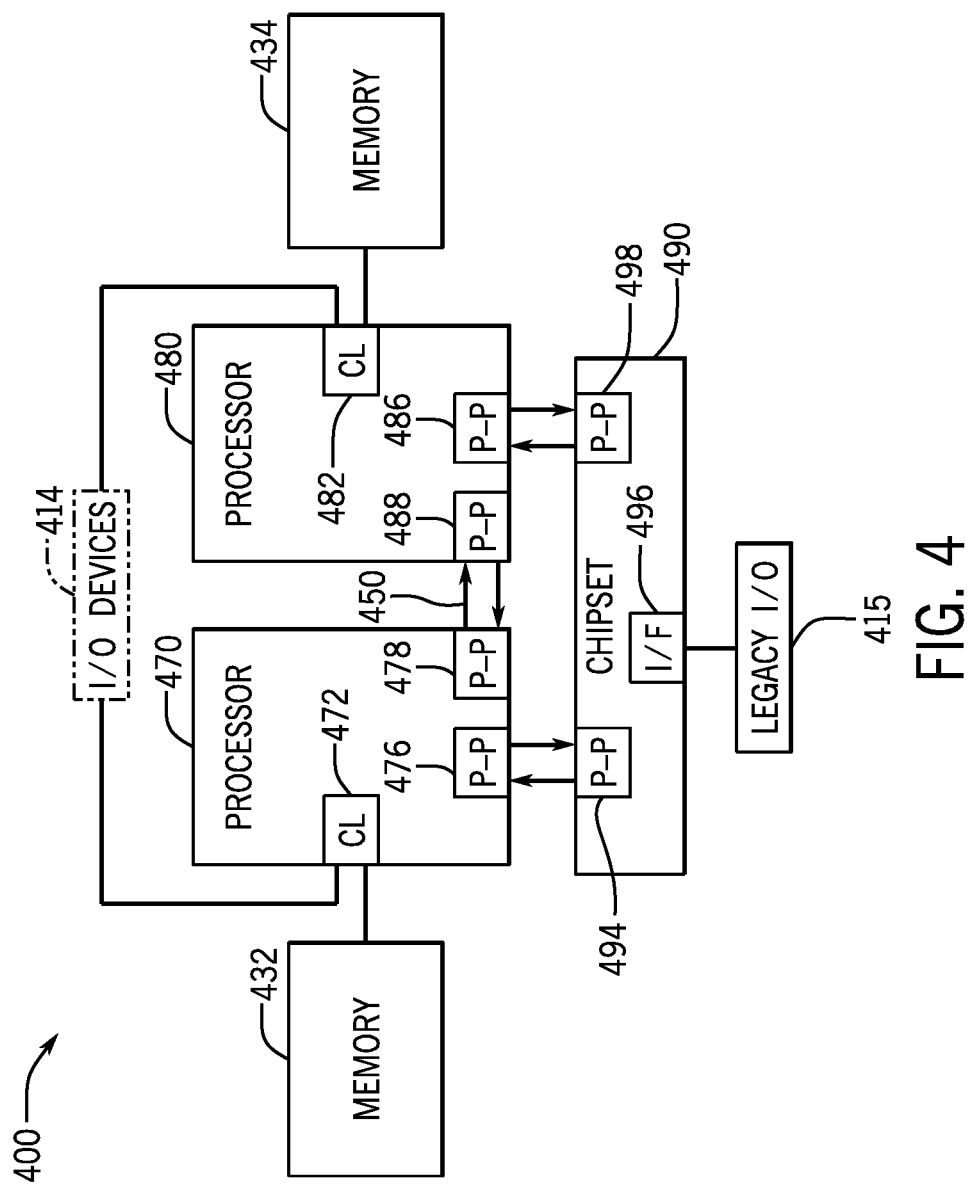
FIG. 4 is a block diagram of another specific example of the computer system of FIG. 2, in accordance with an embodiment of the disclosure.

FIGS. 2-4 are block diagrams of exemplary computer architectures that may implement the data processing system 100. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 2, shown is a block diagram of a system 200 in accordance with one embodiment of the disclosure. The system 200 may include one or more processors 210, 215, which are coupled to a controller hub 220. In one embodiment the controller hub 220 includes a graphics memory controller hub (GMCH) 290 and an Input/Output Hub (IOH) 250 (which may be on separate chips); the GMCH 290 includes memory and graphics controllers to which are coupled memory 240 and a coprocessor 245; the IOH 250 couples input/output (I/O) devices 260 to the GMCH 290. Alternatively, one or both of the memory and graphics controllers are integrated within the processor (as described herein), the memory 240, and the coprocessor 245 are coupled directly to the processor 210, and the controller hub 220 in a single chip with the IOH 250.

The optional nature of additional processors 215 is denoted in FIG. 2 with broken lines. Each processor 210, 215 may include one or more processing cores. The memory 240 may be, for example, dynamic random access memory (DRAM), phase change memory (PCM), or a combination of the two. For at least one embodiment, the controller hub 220 communicates with the processor(s) 210, 215 via a multi-drop bus, such as a frontside bus (FSB), point-to-point interface such as QuickPath Interconnect (QPI), or similar connection 295.

In one embodiment, the coprocessor 245 is a special-purpose processor, such as, for example, a high-throughput MIC processor, a network or communication processor, compression engine, graphics processor, GPGPU, embedded processor, or the like. In one embodiment, controller hub 220 may include an integrated graphics accelerator. There can be a variety of differences between the physical resources 210, 215 in terms of a spectrum of metrics of merit including architectural, microarchitectural, thermal, power consumption characteristics, and the like.

In one embodiment, the processor 210 executes instructions that control data processing operations of a general type. Embedded within the instructions may be coprocessor instructions. The processor 210 recognizes these coprocessor instructions as being of a type that should be executed by the attached coprocessor 245. Accordingly, the processor 210 issues these coprocessor instructions (or control signals representing coprocessor instructions) on a coprocessor bus or other interconnect, to coprocessor 245. Coprocessor(s) 245 accept and execute the received coprocessor instructions.

Referring now to FIG. 3, shown is a block diagram of a first more specific exemplary system 300 in accordance with an embodiment of the disclosure. As shown in FIG. 3, multiprocessor system 300 is a point-to-point interconnect system, and includes a first processor 370 and a second processor 380 coupled via a point-to-point interface 350. In one embodiment of the disclosure, processors 370 and 380 are respectively processors 210 and 215, while coprocessor 338 is coprocessor 245. In another embodiment, processors 370 and 380 are respectively processor 210 coprocessor 245.

Processors 370 and 380 are shown including integrated memory controller (IMC) units 372 and 382, respectively. Processor 370 also includes as part of its bus controller units point-to-point (P-P) interfaces 376 and 378; similarly, second processor 380 includes P-P interfaces 386 and 388. Processors 370, 380 may exchange information via a point-to-point (P-P) interface 350 using P-P interface circuits 378, 388. As shown in FIG. 3, IMCs 372 and 382 couple the processors to respective memories, namely a memory 332 and a memory 334, which may be portions of main memory locally attached to the respective processors.

Processors 370, 380 may each exchange information with a chipset 390 via individual P-P interfaces 352, 354 using point-to-point interface circuits 376, 394, 386, 398. Chipset 390 may optionally exchange information with the coprocessor 338 via a high-performance interface 392. In one embodiment, the coprocessor 338 is a special-purpose processor, such as, for example, a high-throughput MIC processor, a network or communication processor, compression engine, graphics processor, GPGPU, embedded processor, or the like. A shared cache (not shown) may be included in either processor or outside of both processors, yet connected with the processors via P-P interconnect, such that either or both processors' local cache information may be stored in the shared cache if a processor is placed into a low power mode. Chipset 390 may be coupled to a first bus 316 via an interface 396. In one embodiment, first bus 316 may be a Peripheral Component Interconnect (PCI) bus, or a bus such as a PCI Express bus or another third generation I/O interconnect bus, although the scope of the disclosure is not so limited.

As shown in FIG. 3, various I/O devices 314 may be coupled to first bus 316, along with a bus bridge 318 which couples first bus 316 to a second bus 320. In one embodiment, one or more additional processor(s) 315, such as coprocessors, high-throughput MIC processors, GPGPUs, accelerators (such as, e.g., graphics accelerators or digital signal processing (DSP) units), field programmable gate arrays, or any other processor, are coupled to first bus 316. In one embodiment, second bus 320 may be a low pin count (LPC) bus. Various devices may be coupled to a second bus 320 including, for example, a keyboard and/or mouse 322, communication devices 327 and a storage unit 328 such as a disk drive or other mass storage device which may include instructions/code and data 330, in one embodiment. Further, an audio I/O 324 may be coupled to the second bus 320.

Note that other architectures are possible. For example, instead of the point-to-point architecture of FIG. 3, a system may implement a multi-drop bus or other such architecture.

Referring now to FIG. 4, shown is a block diagram of a second more specific exemplary system 400 in accordance with an embodiment of the disclosure. Like elements in FIGS. 3 and 4 bear like reference numerals, and certain aspects of FIG. 3 have been omitted from FIG. 4 in order to avoid obscuring other aspects of FIG. 4. FIG. 4 illustrates that the processors 370, 380 may include integrated memory and I/O control logic ("CL") 372 and 382, respectively. Thus, the CL 372, 382 include integrated memory controller units and include I/O control logic. FIG. 4 illustrates that not only are the memories 332, 334 coupled to the CL 372, 382, but also that I/O devices 414 are also coupled to the control logic 372, 382. Legacy I/O devices 415 are coupled to the chipset 390.

Embodiments of the page table structures and of page walk structures disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device. For purposes of this application, a processing system includes any system that has a processor, such as, for example; a digital signal processor (DSP), a microcontroller, an application specific integrated circuit (ASIC), or a microprocessor.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable (CD-RW) media, and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Figure 5:
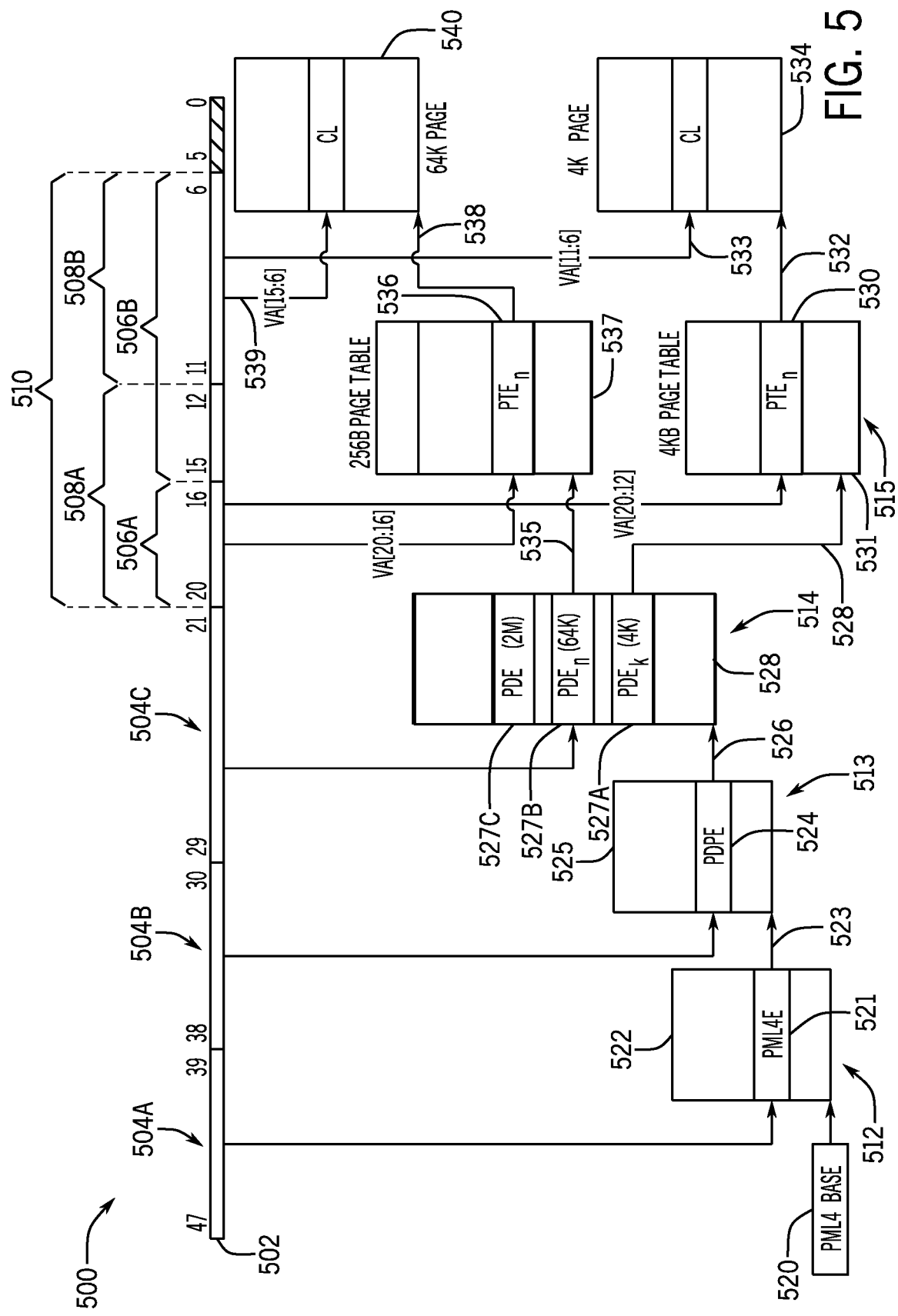
FIG. 5 is a schematic diagram of a page walk system that employ page tables of variable size, in accordance with an embodiment of the disclosure.

FIG. 5 illustrates a page-walking diagram 500 that uses reduced page table memory and may be implemented in any of the above-described systems. The page-walking diagram may operate to identify the physical page associated with a virtual address 502. Virtual address 502 may have page walk level portions 504A, 504B, and 504C that may be associated with levels 4, 3, and 2 of the page walk method, as detailed above. When operating with pages of size 64 KB, page walk level 1 and the memory offset portions may be 506A and 506B, respectively. When operating with pages of size 4 KB, page walk level 1 and the memory offset portions may be 508A and 508B, respectively. When operating with pages of size 2 MB, portion 510 may a memory offset portion. The overlapping addressing mechanism in page levels 1 and in the memory offset, along with other features described herein, facilitate the reduction in the memory resources used by the page table described herein.

The page walk method may be performed iteratively along page walk level 4 (level 512), page walk level 3 (level 513), page walk level 2 (level 514), and page walk level 1 (level 515). In the page walk level 512, an initial base address 520 may be combined with (e.g. added to) portion 504A to identify a page table entry 521 in level 4 page table 522. The table entry from page table 522 may point to a base address 523 of level 3 page table 525. In the page walk level 513, the base address 523 may be combined with portion 504B to identify the next page table entry 524 in level 3 page table 525. The entry from page table 525 may point to a base address 526 of level 2 page table 528. In the page walk level 514, the base address 526 may be combined with portion 504C to identify the next table entry in level 2 page table 528. In the illustrated system, level 2 page table 528 may have 3 types of entry, page table entries 527A, 527B, and 527C, and each entry may be associated with page sizes 4 KB (page 534), 64 KB (page 540), and 2 MB (not illustrated), respectively. Details of the relationship between the entries and the size of the page are detailed below, in the discussion of FIGS. 7A-7G.

When portion 504C refers to entry 527A, page walk level 515 will identify a base address 529 of a 4 KB page table 531. Page table 531 may include 512 entries such as entry 530, and each entry may point to a 4 KB page such as page 534. When portion 504C refers to page table entry 527B, page walk level 515 will identify a base address 535 of a 256 B page table 537. Page table 537 may include 32 entries such as page table entry 536, and each entry may point to a 64 KB page such as page 540. As such, both page tables 531 and 537 address 2 MB of physical location. However, in contrast with page table 537 that occupies 256 B, a conventional page table addressing 64 KB pages would occupy 4 KB, as the conventional page table would store entries for multiple 4 KB in an arrangement similar to that of page table 531.

More generally, the size of the table may be adjusted based on the size of the page associated with the entry. Based on the page size and the amount of memory covered by the entries in a page table at a page level, the size of the page table may be adjusted. In the above example, each level 515 page table covers 2 MB of memory. As such, 4 KB pages may employ 4 KB page tables to store 512 entries, 64 KB pages may employ 256 B page tables to store 32 entries, 256 KB pages may employ 64 B to store 8 entries, and 1 MB pages may employ 16 B page tables to store 2 entries. This allows the allocation of pages with diverse size granularity between the 2 MB and 4 KB page sizes and with economy in the memory space occupied by the page tables. Moreover, certain memory systems may retrieve a page table to the local memory in fixed lengths and the use of reduced sized tables may facilitate pre-fetching. For example, if a system operates by retrieving 4 KB of memory per paging event, the retrieval of a page table of 256 B due to a specific page walk event may be accompanied by a pre-fetch of 15 other page tables of 256 B for future use. This pre-fetching may accelerate the operations of the computing system.

As discussed above, in the page walk level 512, a base address 529 may be combined with portion 508A to identify a page table entry 530 in level 1 page table 531. Entry 530 may point to base address 532 for a 4 KB page 534. Portion 508B may be used to determine the specific memory requested by virtual address 502. The portion 508A may have 9 bits to address one of the 512 entries in page table 531 and the portion and the portion 508B may have 6 bits to address one of 64 data blocks 533 in page 534.

For retrieval of 64 KB pages, in the page walk level 512, a base address 535 may be combined with portion 506A to identify a page table entry 536 in the reduced-size page table 537. Page table entry 536 may point to base address 538 for a 64 KB page 540. Portion 506B may be used to determine the specific memory requested by virtual address 502. In contrast with portions 508A and 508B, the portion 506A may have 5 bits to address one of the 32 entries in page table 537 and the portion and the portion 506B may have 10 bits to address one of 1024 data blocks 539 in page 540. For retrieval of a 2 MB page, in page walk level 514, entry 527C may point to a base address of the 2 MB page (not illustrated), and the 15-bit portion 510, may be used to identify one of the 32K blocks in the 2 MB page.

Figure 6:
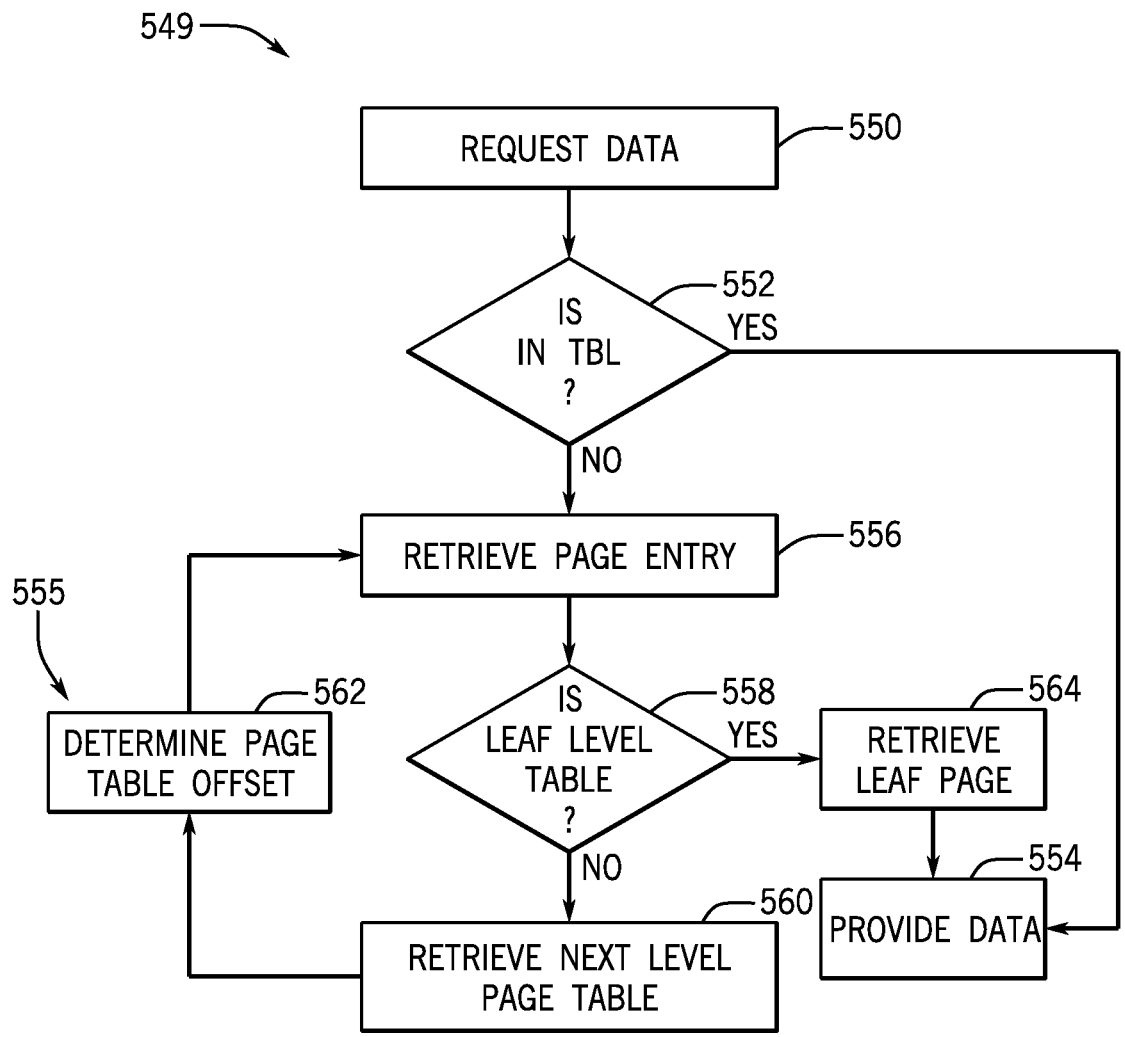
FIG. 6 is a flow chart for a method to implement a page walk strategy that employ tables of variable size, in accordance with an embodiment of the disclosure.

The memory translation method 549, discussed above, may be implemented by a memory translation system (e.g., memory translation system 102) as the flow chart illustrated in FIG. 6. The memory translation method 549 may begin the memory translation system receiving a request for data (block 550), which may include a virtual address. In a decision block 552, the memory address system may verify if the virtual address is located in the translation look-aside buffer (TLB). If the virtual address translation is cached in the TLB, the access to the memory may be provided immediately, in block 554. If, in decision block 552, a paging fault occurs, the memory address system may begin a page walk process 555. As discussed above, the page walk process 555 may be iterative. In each iteration, a page entry from a page table may be retrieved in block 556. The translation system may determine if the page entry stores a reference to a page table or if the entry is a leaf level entry that points to a page, in decision block 558. The translation system may perform this decision by inspecting flags (e.g., page table size flag, page size flag) in the page table entry.

If the entry points to a page table, the memory translation system may retrieve the next page table in block 560. Inspection of flags in the page table entry may determine the size of the page table (e.g., 4 KB page table, 256 B page table) during a page walk iteration in which multiple table sizes are possible. In some embodiments, the retrieval of smaller sized page tables may be accompanied by pre-fetching of other page tables, as discussed above. In block 562, the offset within the page table may be determined from the portions of the virtual address, as discussed above. The number of bits in the portion may be determined based on the size of the page table, as identified in block 560. Based on the page table and the offset, a new iteration of the page walk process 555 may start in block 556. In decision block 558, once a page table entry points to a page (e.g., entry is a leaf), the memory translation system may retrieve the leaf page in block 564. Access to the requested memory may be provided in block 554.

It should be understood that the memory translation system that implements the memory translation method 549 may be a part of memory management unit (MMU) of the processor, or may be a part of a memory interface of the processor. The memory translation system may be implemented in software, programmable fabric (e.g., field programmable gate arrays), and/or in hardened logic. Moreover, while the memory translation method 549 was described in an iterative manner, implementations may employ sequential processes (i.e., unrolled loop implementations).

Figure 7A:
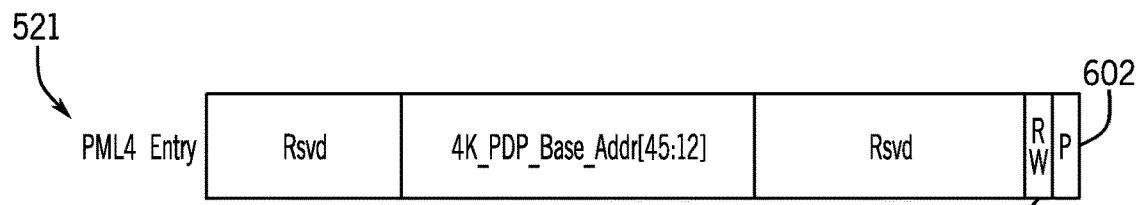
FIG. 7A illustrates an example of a page table entry that may be used with the page walk system of FIG. 5, in accordance with an embodiment of the disclosure.
Figure 7B:
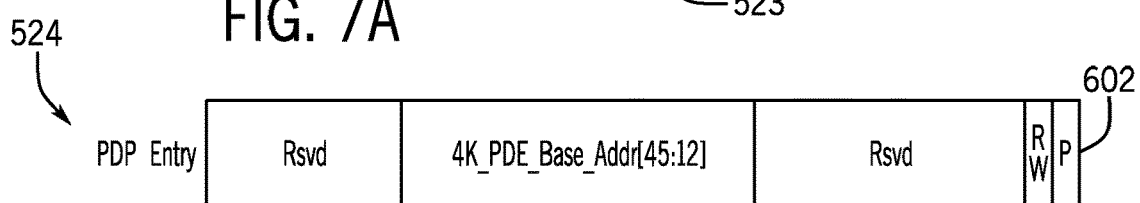
FIG. 7B illustrates an example of a page table entry that may be used with the page walk system of FIG. 5, in accordance with an embodiment of the disclosure.
Figure 7C:
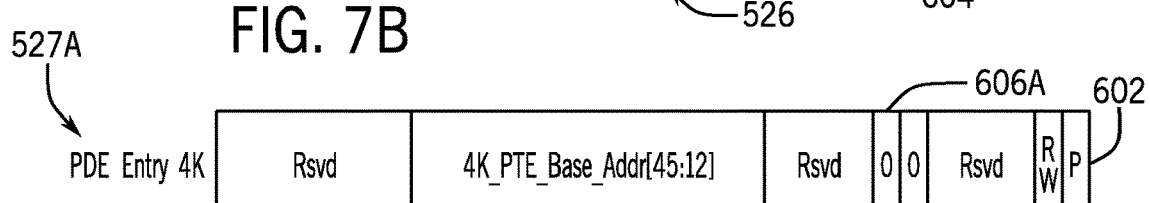
FIG. 7C illustrates an example of a page table entry that may be used with the page walk system of FIG. 5, in accordance with an embodiment of the disclosure.
Figure 7D:
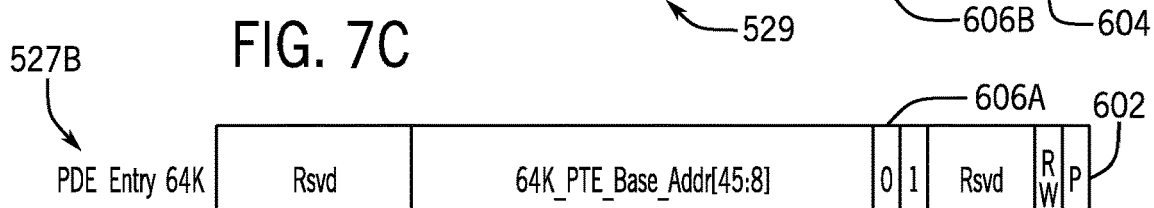
FIG. 7D illustrates an example of a page table entry that may be used with the page walk system of FIG. 5, in accordance with an embodiment of the disclosure.
Figure 7E:
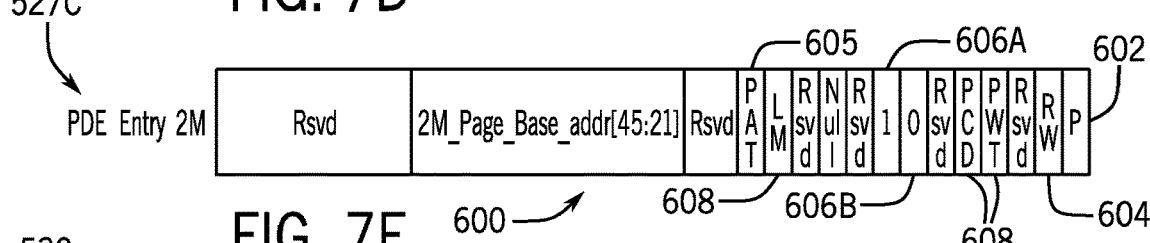
FIG. 7E illustrates an example of a page table entry that may be used with the page walk system of FIG. 5, in accordance with an embodiment of the disclosure.
Figure 7F:
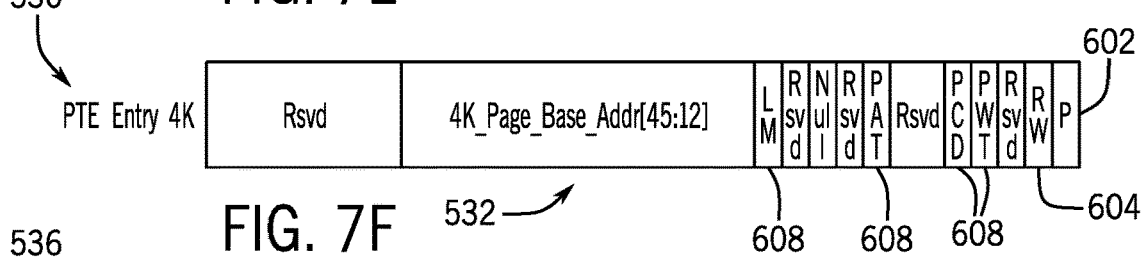
FIG. 7F illustrates an example of a page table entry that may be used with the page walk system of FIG. 5, in accordance with an embodiment of the disclosure.
Figure 7G:
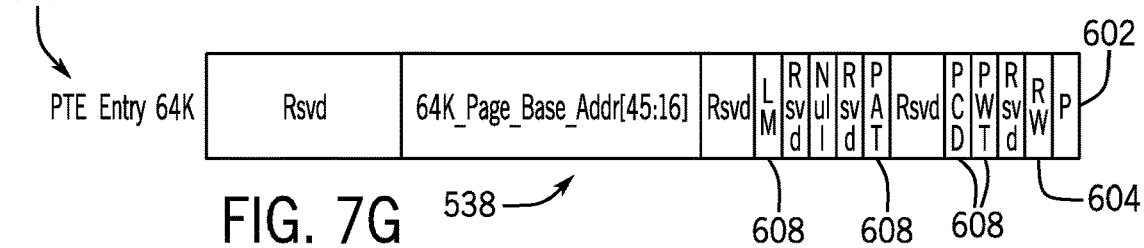
FIG. 7G illustrates an example of a page table entry that may be used with the page walk system of FIG. 5, in accordance with an embodiment of the disclosure.

FIGS. 7A-G illustrate examples of page table entries that may be used with the page walk strategy illustrated in FIG. 5. Page table entry 521 of FIG. 7A is a table entry that may be used in the level 4 page table 522, page table entry 524 of FIG. 7B is a table entry that may be used in the level 3 page table 525, page table entries 527A, 527B, and 527C of FIGS. 7C, 7D, and 7E, respectively, may be used in the level 2 page table 528, entry 530 of FIG. 7F may be used in the 4 KB level 1 page table 531 implementations of the system, and page table entry 536 of FIG. 7G may be used in the 256 B level 1 page table 537. As discussed above, the entries may store a physical address of a page table or, when the entry is a leaf of the page walk, a physical address of a page. In the illustration, page table entries 521, 524, 527A, and 527B store, respectively, base addresses 523, 526, 529, and 535 to a page table whereas page table entries 527C, 530, and 536 store, respectively, base addresses 600, 532, and 538 to a page in the memory. Page table entries may also include flags. Present flags 602 may indicate if the page or page table addressed by the page table entry is present or if a page fault may occur, and the read/write flag 604 may be used to indicate the type of page fault (i.e., write exception, read exception). Page control flags 605 may be used to control paging and/or caching of page tables or memory pages during page walking. A local memory flag 608 may indicate if the page or page table addressed by the page table entry is in the local memory or if it is stored in a storage memory.

The page walk method described herein may employ tables and pages of variable size and, as such, may include a process in which the page table entry is a leaf entry, such as the decision block 558 and the block 562 in FIG. 6. The information may be encoded in the form of page size flags in a page table entry. In the illustrated example, page flags 606A and 606B in page table entries 527A, 527B, and 527C encode that information. In the example, a '00' in entry 527A indicates that the entry refers to a 4 KB page, a '01' in entry 527B indicates that the entry refers to a 64 LB page, and a '10' in entry 527C indicates that the entry refers to a 2 MB page. Logic circuitry may, using this information, determine that entry 527C is a leaf node. Furthermore, logic circuitry may, using this information, determine that page table entry 527A points to a 4 KB page table and that page table entry 527B points to a 256 B page table. It should be noted that to address the variable sized tables, the size of the address of a page table may be adjusted. In the example, the base addresses 523, 526, and 529 are 4 KB-aligned pointers with 34 bits as they address 4 KB page tables, and base address 535 is a 256 B-aligned pointer with 38 bits that addresses a 256 B table. Moreover, the base addresses 532, 538, and 600 are, respectively, a 4 KB aligned pointer with 34 bits, a 64 KB aligned pointer with 30 bits, and a 2 MB aligned pointer with 25 bits.

While the above illustrations in FIGS. 5 and 7A-G refer to embodiments used with a specific architecture, it should be understood that the features described therein may be adapted or rearranged to implement the page walking methods above described in different architectures. As such, it should be understood that the above-discussed features, such as the variable-sized page tables, page size flags, and the control logic may be used with virtual memory management controllers implementing a different number of page walk levels, a different number of sizes for memory and for page table sizes, different addressing schemes, and different encodings for information in the page table entries.

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A processor comprising:
processing circuitry coupled to one or more memory devices; and
memory translation circuitry that receives a virtual address and determines a physical address in the one or more memory devices that is associated with the virtual address, wherein the memory translation circuitry comprises page walk logic circuitry that identifies a memory page associated with the virtual address using a sequence of page walk iterations, wherein at least one page walk iteration of the sequence of page walk iterations comprises:
identifying a page table entry in a page table that corresponds to the at least one page walk iteration using a portion of the virtual address and a previous base address from a previous iteration;
determining a next page table based on a base address in the page table entry;
determining a size of the next page table based on a page table size flag in the page table entry; and
accessing the next page table based on the size of the next page table and the base address.

2. The processor of claim 1, wherein the at least one page walk iteration comprises determining if the base address in the page table entry is associated with the next page table or with the memory page.

3. The processor of claim 2, wherein, in the at least one page walk iteration, the next page table associated with the page table entry comprises a 256 B page table associated with a 64 KB memory page or a 4 KB page table associated with a 4 KB memory page, or wherein the memory page associated with the page table entry comprises a 2 MB memory page.

4. The processor of claim 1, wherein the at least one page walk iteration comprises determining a second size of the memory page based on a page size flag in the page table entry.

5. The processor of claim 1, wherein the at least one page walk iteration comprises determining a second size of the memory page based on the page table size flag in the page table entry.

6. The processor of claim 1, wherein the processing circuitry comprises one or more of a central processing unit (CPU) or a graphics processing unit (GPU) or both.

7. The processor of claim 1, wherein the processing circuitry comprises a plurality of processes, and wherein the memory translation circuitry comprises a virtual memory system.

8. The processor of claim 1, wherein the one or more memory devices comprise a random access memory (RAM) device, a hard disk memory device, or a solid-state memory device, or any combination thereof.

9. The processor of claim 1, wherein the size of the next page table has 256 B or 4 KB.

10. The processor of claim 9, wherein the virtual address comprises 48 bits, and wherein a second size of the memory page is one of 4 KB, 64 KB, 2 MB, or 1 GB.

11. The processor of claim 1, wherein the memory translation circuitry comprises a translation look-aside buffer (TLB).

12. A page walk method to determine a memory page from a virtual address, the method comprising a sequence of page walk levels, wherein a respective page walk level comprises:
   determining a respective page table entry in a respective page table that corresponds to the respective page walk level using a respective portion of the virtual address and a base address from a previous page walk level or an initial base address; and
   accessing a next page table based on a respective base address in the respective page table entry;
   wherein at least one respective page walk level comprises determining a size of the next page table based on a flag in the respective page table entry.

13. The page walk method of claim 12, wherein the respective page walk level comprises determining if the respective page table entry refers to the next page table or to the memory page.

14. The page walk method of claim 12, wherein the sequence of page walk levels comprises up to 4 page walk levels, and wherein the at least one respective page walk level is a second page walk level.

15. The page walk method of claim 12, wherein the size of the next page table is one of 256 B or 4 KB.

16. The page walk method of claim 15, wherein accessing the next page table comprises pre-fetching 15 page tables adjacent to the next page table when the size of the next page table is 256 B.

17. A data processing system, comprising:
   memory comprising a plurality of page tables arranged in page table levels and a plurality of memory pages;
   processing circuitry comprising a plurality of processes; and
   a memory translation logic to access a first memory page based on a first virtual address received by a first process of the plurality of processes, wherein the memory translation logic comprises page walk logic circuitry that to identify a sequence of page tables in the plurality of page tables using the first virtual address; and
   wherein a page table in the sequence of page tables is in a different page table level and at least one page table level comprises a first page table of a first size and second page table of a second size different from the first size.

18. The data processing system of claim 17, wherein the first size is 256 B and the second size is 4 KB.

19. The data processing system of claim 17, wherein the at least one page table level is a first page table level, wherein a third page table of a second page table level comprises a page table entry that comprises a base address for a fourth page table of the first page table level and a flag indicating a third size of the fourth page table.

20. The data processing system of claim 19, wherein the flag indicates a size of a second memory page associated with the page table entry.

* * * * *